(12) United States Patent
Tarig et al.

(10) Patent No.: US 6,449,571 B1
(45) Date of Patent: Sep. 10, 2002

(54) SYSTEM AND METHOD FOR SENSOR RESPONSE LINEARIZATION

(75) Inventors: Faisal Tarig, Plano; Tamas I. Pattantyus, Dallas, both of TX (US)

(73) Assignee: Mykrolis Corporation, Bedford, MA (US)

( * ) Notice: Subject to any disclaimer, the term of this patent is extended or adjusted under 35 U.S.C. 154(b) by 0 days.

(21) Appl. No.: 09/350,747

(22) Filed: Jul. 9, 1999

(51) Int. Cl.$^7$ .......................... G01F 25/00; G06F 19/00
(52) U.S. Cl. .................. 702/86; 702/100; 702/104; 137/486; 137/487.5
(58) Field of Search ............... 702/86, 100, 104, 702/45, 50; 73/1.35, 861.04, 861.66; 137/487.5, 486

(56) References Cited

U.S. PATENT DOCUMENTS

| | | | |
|---|---|---|---|
| 4,059,982 A | 11/1977 | Bowman | 73/15 |
| 5,062,446 A | * 11/1991 | Anderson | 137/486 |
| 5,369,603 A | 11/1994 | Myers | 364/571.02 |
| 5,660,207 A | 8/1997 | Mudd | 137/599 |
| 5,710,370 A | * 1/1998 | Shanahan et al. | 73/1.35 |
| 5,765,283 A | 6/1998 | Mudd | 29/890 |
| 5,850,850 A | 12/1998 | Mudd | 137/486 |
| 5,911,238 A | * 6/1999 | Bump et al. | 73/204.15 |
| 5,944,048 A | * 8/1999 | Bump et al. | 137/487.5 |
| 5,975,126 A | * 11/1999 | Bump et al. | 137/487.5 |

FOREIGN PATENT DOCUMENTS

| | | | |
|---|---|---|---|
| EP | 0 519 751 A2 | 12/1992 | G01F/1/78 |
| EP | 0 834 723 A1 | 4/1998 | G01F/25/00 |
| EP | 0 890 828 A1 | 1/1999 | G01F/25/00 |

OTHER PUBLICATIONS

International Search Report dated Dec. 6, 2000.
*LM2674: Simple Switcher Power Converter High Efficiency 500 mA Step–Down Voltage Regulator* by National Semiconductor Corporation dated Sep., 1998.
Silicon Processing for the VLSI Era, pp. 165, 166.

* cited by examiner

*Primary Examiner*—Bryan Bui
(74) *Attorney, Agent, or Firm*—Gray Cary Weave & Freidenrich LLP

(57) ABSTRACT

A system and method for generating a linearized sensor signal p from a sensor signal m using a $k^{th}$-degree polynomial The coefficients of the $k^{th}$-degree polynomial can be calculated using a least-squares method by a computer. The computer can calculate for $1 < j \leq k$ the $(2j-1)$ root of the $j^{th}$ coefficient $a_j$ of the $k^{th}$-degree polynomial and download the coefficients and the resulting roots $r_j$ to a storage device in a digital signal processor (DSP). For $2 < j \leq k$, the DSP can calculate $$\left( a_j^{\frac{1}{2j-1}} m \right)^j$$

and multiply the result by $$\left( a_j^{\frac{1}{2j-1}} \right)^{j-1}.$$

The resulting terms can be added to the calculation of $a_1 m$ to generate the $k^{th}$-degree polynomial. The $k^{th}$-degree polynomial is the linearized sensor signal.

17 Claims, 3 Drawing Sheets

SYSTEM AND METHOD FOR SENSOR RESPONSE LINEARIZATION

TECHNICAL FIELD OF THE INVENTION

This invention relates generally to sensor response linearization systems and methods, and more particularly to sensor response linearization systems and methods in a mass flow controller.

BACKGROUND OF THE INVENTION

Transducers (sensors) are objects that convert one form of energy into another. There are many types of sensors, such as pressure sensors, electrical sensors, chemical sensors, and temperature sensors. Sensors provide information about the state of a process. This information is often used to both monitor and control the process. Sensors are widely used throughout the Semiconductor Industry to closely monitor and control various industry processes. As channel lengths and line widths decrease, allowable process variations in the Semiconductor Industry also decrease. Therefore, sensors in the Semiconductor Industry must produce accurate and reliable results so that processes can be carefully and precisely monitored.

One type of sensor often used in semiconductor processes is a flow sensor. A flow sensor measures the gas flow into a process chamber. Flow sensors are typically thermal sensors. A thermal flow sensor is often composed of two resistance temperature sensors wound around a capillary tube. When gas flows through the sensor, heat is carried downstream and the temperature difference is proportional to the mass flow rate of the gas. Unfortunately, many sensors, including flow sensors, have an innate non-linear response. Consequently, many methods have been implemented to linearize the output of the sensor prior to inputting the sensor signal into a control system.

Analog methods prior art sensor linearization has been achieved with non-linear electronic components such as diodes and transistors. These non-linear electronic components are often arranged in a compensating circuit topology such that the non-linear characteristic of the compensating circuit is the inverse of the sensors non-linear response. FIG. 1 illustrates the relationship between a correction response 10 of a compensating circuit topology, a sensor response 12, and the resulting linearized response 14.

Unfortunately, the use of compensating circuits has inherent problems. First, these types of compensating circuits are often adjusted manually by a technician and may be a tedious and time-consuming calibration process. Second, the non-linear components may change their characteristics with temperature and any shift of the null point may result in large errors in the corrected output. A null point shift also may be caused by the sensor itself. These sources of error can be reduced or completely eliminated by the digital methods.

Digital Methods include interfacing a sensor with a digital microprocessor. When the sensor is interfaced with a microprocessor, the non-linear sensor characteristics can be corrected by computational methods. These computational methods include polynomial curve fitting.

Unfortunately, digital methods also have some disadvantages. The coefficients of the polynomial curve are often calculated using mathematical formulas that may be too cumbersome for most microprocessors using integer arithmetic. Also, the calculations may include numbers that may be either too large or too small for the limited number field of the microprocessor for linearization. The situation is further aggravated if the degree of the polynomial is greater than two.

Other methods for sensor linearization include combining analog and digital techniques. These methods, however, also suffer from limitation caused by either additional circuit components or a limited number field in the microprocessor.

Ultimately there is a need for a technique for sensor response linearization that overcomes the disadvantages of prior art analog and digital methods of linearization. The method should enable calibration of a sensor with little or no manual interaction by a technician or engineer. Also the method should not be limited by the circuit or computer components assisting in the linearization process.

SUMMARY OF THE INVENTION

The present invention provides a system and method for sensor response linearization that substantially eliminates or reduces disadvantages and problems associated with previously developed systems and methods for sensor response linearization.

More specifically the present invention provides a method for generating a linearized sensor signal p from a sensor signal m using a $k^{th}$-degree polynomial. The coefficients of the $k^{th}$-degree polynomial can be calculated by using the least-squares method. The computer can calculate for $2<j \leq k$ the $(2j-1)$ root of the $j^{th}$ coefficient $a_j$ of the $k^{th}$-degree polynomial and download the coefficients and resulting roots $r_j$ to a storage device in a digital signal processor (DSP).

For $2<j \leq k$, the DSP can calculate $$\left(a_j^{\frac{1}{2j-1}} m\right)^j$$

and multiply the result by $$\left(a_j^{\frac{1}{2j-1}}\right)^{j-1}.$$

The resulting terms can be added to the calculation of $a_1 m$ to generate the $k^{th}$-degree polynomial. The $k^{th}$-degree polynomial is the linearized sensor signal.

The present invention provides a technical advantage in that it does not require manual calibration or "tweaking" by a technician or engineer. Calibration is performed by a computer based on output of the sensor for various known process rates. The method does not require "tweaking" of analog circuit components to adjust compensating circuitry as with prior art analog methods of calibration.

The present invention also provides another technical advantage in that it can accommodate computer multiplication of very small and very large numbers. Calculations using such numbers may result in errors due to the limited number field on available microprocessors often used for control systems. By enabling accurate calculations with both very small numbers and very large numbers, the present invention provides a more accurate digital method of linearization.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGURES, like numerals being used to refer to like and corresponding parts of various drawings.

The present invention provides a method for linearizing a sensor signal using a $k^{th}$-degree polynomial. The method enables the processing of large numbers multiplied by small numbers when the number fields for both large and small numbers are limited. In addition, the algorithm makes higher degree polynomial approximation feasible using a DSP type microprocessors with integer arithmetic and limited number field.

Figure 1:
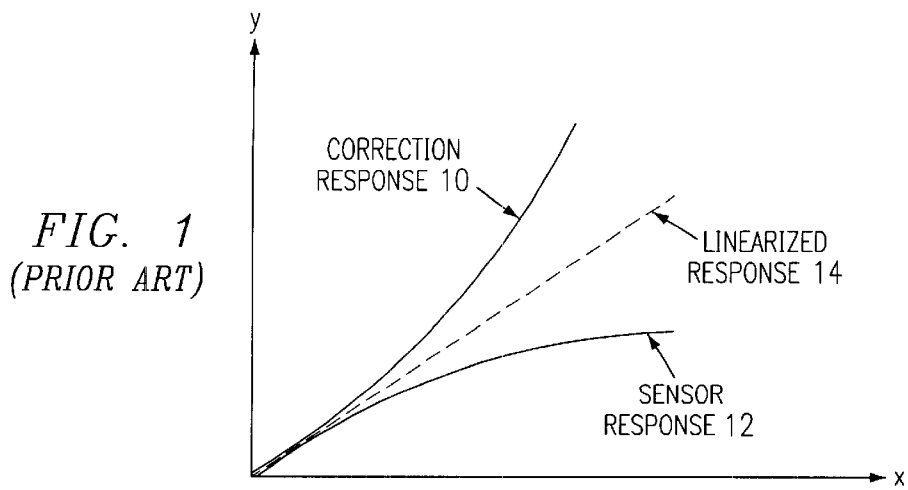
FIG. 1 is a graph of a prior art correction response, sensor response, and linearized response.
Figure 2:
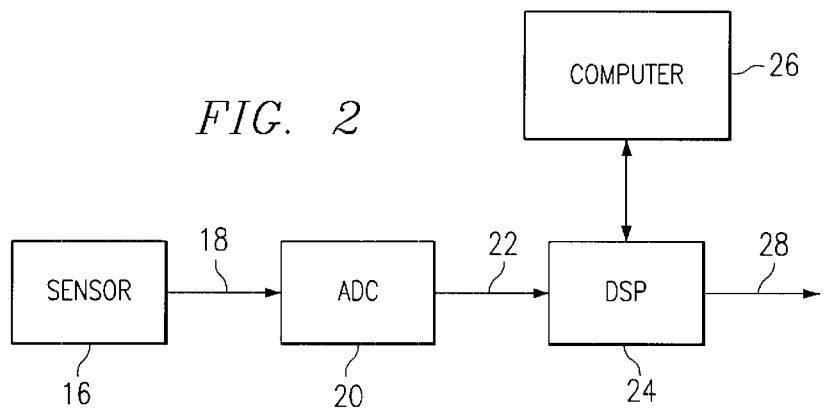
FIG. 2 is a block diagram of one embodiment of the present invention.

FIG. 2 is the block diagram of one embodiment of the present invention. Sensor 16 can produce analog sensor signal 18. Analog sensor signal 18 can be input into analog-to-digital converter (ADC) 20 to produce digital sensor signal 22. Digital sensor signal 22 can be input into digital signal processor (DSP) 24. DSP 24, in conjunction with a computer 26, can produce linearized digital sensor signal 28.

Figure 3:
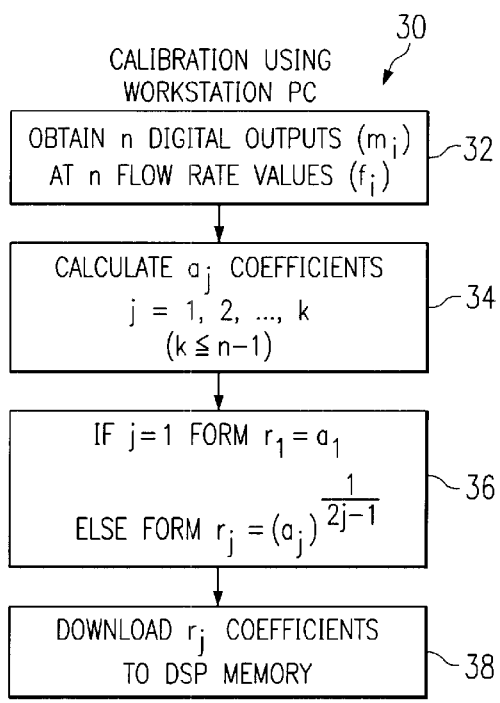
FIG. 3 is the flow diagram of one embodiment of the calibration process.

FIG. 3 is a flow diagram of the embodiment illustrated in FIG. 2. Prior to using the system of FIG. 2 to produce linearized digital sensor signal 28, computer 26 can perform a calibration process. FIG. 3 is a flow diagram of one embodiment of the calibration process. Computer 26 can perform the calibration process with powerful test and measurement software. At step 32, a set of data $$\{m_1, f_1, m_2, f_2, \ldots, m_n, f_n\} \qquad [\text{EQN 1}]$$

can be obtained. $m_i$ represents the $i^{th}$ measured value of digital sensor signal 22 from sensor 16, $f_i$ is the corresponding actual value of the process being measured and i=1,n, where n is the number of measured values. The linearization method can implement a polynomial fit on digital sensor signal 22. The polynomial fit is given by, $$p_i(m_i) = a_1 m_i + a_2 m_i^2 + \ldots + a_k m_i^k, \qquad [\text{EQN 2}]$$

where $p_i$ is the $i^{th}$ predicted (linearized) value of the $i^{th}$ measured value $m_i$ of digital sensor signal 22 and k is the degree of the polynomial with k≦n−1. Calibration is used to calculate the coefficients $(a_1, a_2, \ldots, a_k)$ of the polynomial in equation 2. The coefficients may be calculated by the least error-square method at step 34. In this method the coefficients $(a_1, a_2, \ldots, a_k)$ are chosen such that the total error between the predicted values and the actual values over all n data points is minimized. If the total error S is given by the sum of the individual errors squared, $$S = \sum_{i=1}^{n}(p_i - f_i)^2 = \sum_{i=1}^{n}(a_1 m_i + a_2 m_i^2 + \ldots + a_k m_i^k - f_i)^2 \qquad [\text{EQN 3}]$$

then the coefficients of $p_i(m_i)$ may be chosen such that, $$\frac{\partial S}{\partial a_1} = \frac{\partial S}{\partial a_2} \ldots = \frac{\partial S}{\partial a_n} = 0. \qquad [\text{EQN 4}]$$

Once the coefficients have been calculated at step 36, computer 26 can calculate for 2<j≦k the (2j−1) root of the $j^{th}$ coefficient $a_j$, $$r_j = a_j^{\frac{1}{2j-1}}. \qquad [\text{EQN 6}]$$

At step 38, computer 26 can download the coefficients and resulting roots $r_j$ in binary form to a storage device in DSP 24.

Figure 4A:
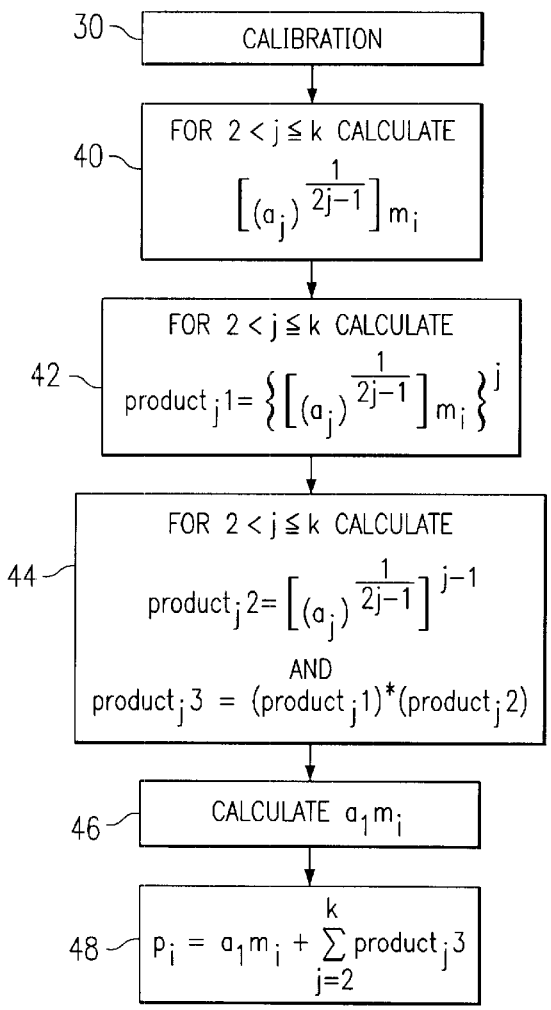
FIG. 4A represents a general flow diagram of one embodiment of the linearization process.

FIG. 4A represents a general flow diagram of one embodiment of the linearization process. For 2<j≦k, steps 40 and 42 can be implemented to calculate $$\left[a_j^{\frac{1}{2j-1}}\right]m_i, \qquad [\text{EQN 7}]$$

and $$\left[\left(a_j^{\frac{1}{2j-1}}\right)m_i\right]^j. \qquad [\text{EQN 8}]$$

respectively. At step 44, DSP 24 can multiply the result of step 42 by $$\left(a_j^{\frac{1}{2j-1}}\right)^{j-1}. \qquad [\text{EQN 9}]$$

At step 46 $a_1 m_i$ can be calculated. The terms resulting from step 44 can be added to $a_1 m_i$ to generate the $i^{th}$ predicted value $p_i$ from the $i^{th}$ measured value at step 48.

Figure 4B:
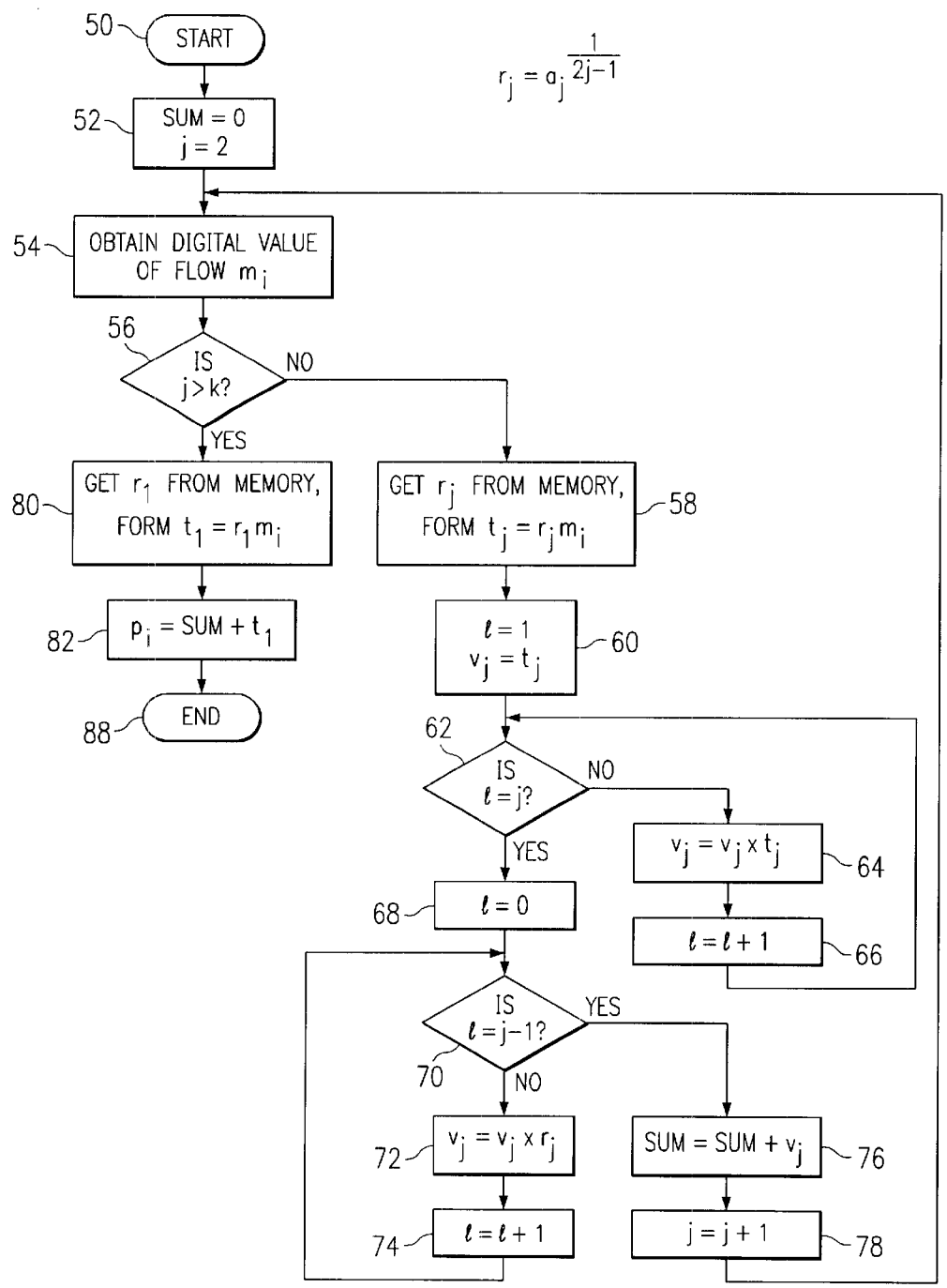
FIG. 4B is a detailed flow diagram of one embodiment of the linearization process.

FIG. 4B represents a detailed flow diagram of another embodiment of the linearization process. At step 50, the process starts. At step 52, SUM is initialized according to the equation SUM=0, while j is initialized according to the equation j=2. At step 54, a digital value, $m_i$ of digital sensor signal 22 is obtained. i ranges from 1 to n where n is the number of digital values in the digital sensor signal 22. At step 56, it is determined whether j is greater than k. If j is not greater than k. then step 58 is implemented. At step 58, $r_j = a_j^{1/2j-1}$ is retrieved from memory in DSP 24. Also the product $t_j = r_j m_i$ is formed. At step 60, an index I=1 is initialized and a variable $v_j$ is set equal to $t_j$. At step 62, it is determined if I=j. At step 64, if I is not equal to j, then variable $v_j = v_j t_j$. At step 66, index I is incremented according to I=I+1. The process then reverts back again to step 62 where I is compared to j. If I=j at step 62, index I is initialized to zero at step 68. It is then determined at step 70 if I=j−1. If I is not equal to J−1, variable $v_j$ is set equal to $v_j r_j$ at step 72. At step 74, I is then incremented according to the equation I=I+1. The process then reverts back to step 70 and it is determined whether I=j−1. If index I=j−1, SUM is incremented according to the equation to SUM=SUM+$v_j$ at step 76. At step 78, j is then incremented according to the equation j=j+1. The process then reverts back to step 56 where it is determined whether j is greater than k. If j is greater than k at step 56, step 80 is implemented. At step 80, variable $r_1$ which is equal to $a_1$, is obtained from memory in DSP 24 Variable $t_1$, which is equal to $r_1 m_I$, is also calculated. In step 82, the $i^{th}$ predicted of the $i^{th}$ measured value $m_I$ of digital sensor signal 22 is calculated according to the equation, $p_i$=SUM+$t_1$. The process ends at step 88.

The method disclosed in FIGS. 4A and 4B is based on the following mathematical facts. First, higher roots of numbers less than one converge towards one. Second, odd integer roots preserve the sign of the number. For example, given $a_3$=−0.0000034, its third root is −0.015036946 and its fifth root is −0.085927. While the original number (−0.0000034) is difficult to handle in integer arithmetic with a limited number field, computing with its fifth root is straightforward. When the polynomial is evaluated, the cubic term is calculated as:

$$\left((a_3)^{\frac{1}{5}} m_i\right)\left((a_3)^{\frac{1}{5}} m_i\right)\left((a_3)^{\frac{1}{5}} m_i\right)\left((a_3)^{\frac{1}{5}}\right)\left((a_3)^{\frac{1}{5}}\right) = a_3 m_i^3. \quad \text{[EQN 10]}$$

Since DSP-type microprocessors can quickly perform multiplication, equation requires DSP 24 to perform only five repeated multiplications:

(1) calculate and store $$\left((a_3)^{\frac{1}{5}} m_i\right)$$

($1^{st}$ multiplication);
(2) multiply the stored number twice with itself ($2^{nd}$ and $3^{rd}$ multiplication);
(3) multiply the product obtained in (2) twice with $$\left((a_3)^{\frac{1}{5}}\right)$$

($4^{th}$ and $5^{th}$ multiplication).

Calculation of the second order term can be done in a similar fashion. This method can easily be extended to higher order polynomial approximations provided the higher order terms have coefficients less than 1 (which is the case in the mass-flow controller applications).

Figure 5:
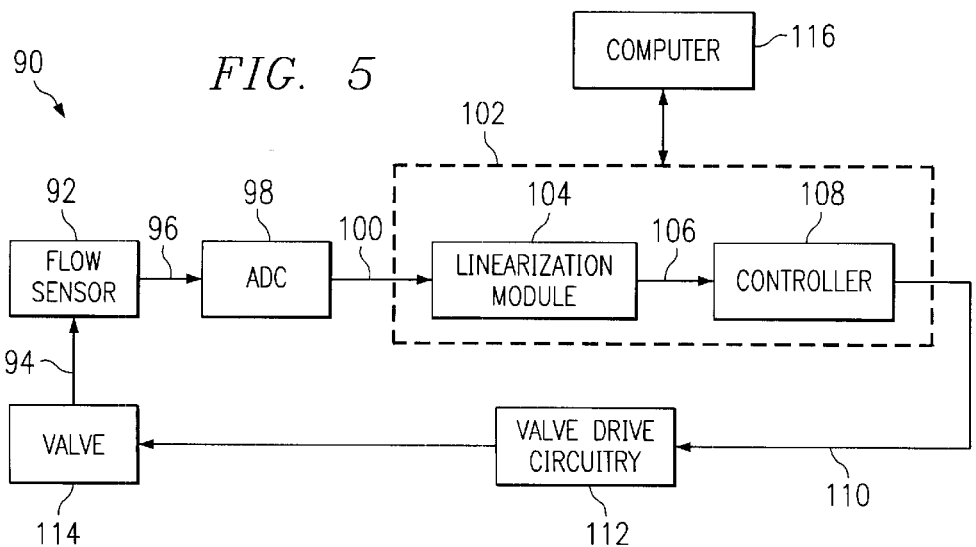
FIG. 5 is another embodiment of the present invention.

FIG. 5 represents one embodiment of the present invention where linearization of a sensor signal takes place in the context of mass flow controller 90. In mass flow controller 90, flow sensor 92 measures actual flow 94. Sensed flow rate signal 96 is input into ADC 98 to produce digital sensed flow rate signal 100. Digital sensed flow rate signal 100 is then input to DSP 102. DSP 102 is programmable to perform the tasks represented by linearization module 104 and controller 108. Linearization module 104 can convert digital sensed flow rate signal 100 into linearized digital sensed flow rate signal 106. Linearized digital sensed flow rate signal 106 can be input to controller 108. Controller 108 can output valve drive signal 110. Valve drive signal 110 can be input to valve drive circuitry 112. Valve drive circuitry 112 can activate valve 114 which directly influences actual flow 94. During the calibration process, DSP 102 is operable to communicate with computer 116, such as a PC, via a connection between computer 116 and DSP 102. Computer 116 can include instructions for performing rigorous mathematical calculations and downloading these calculations to DSP 102. Such calculations may include coefficients for a polynomial fit of digital sensed flow rate signal 100.

In FIG. 5, sensed flow rate signal 96 can be converted to digital sensed flow rate signal 100 by ADC 98. Assuming unipolar input voltages, the maximum input voltage range of ADC 98 can be divided into a number of levels: 0–1024 (10-bit ADC), 0–4096 (12-bit ADC), or 0–65536 (16-bit ADC). The minimum input voltage 0V may correspond to a 0 digital value, while the maximum input voltage corresponds to a digital value of 1023, 4095, or 65535 value depending on the bit number of ADC 98. Most analog-to-digital converters can handle bipolar signals as well. The digital outputs of ADC 98 may range from −512 to 511 (10-bit), −2048 to 2047 (12-bit ADC), or −32768 to 32767 (16-bit ADC). Modern digital signal processor (DSP) computer chips typically support number fields ranging from −32768 to +32767 (16-bit). The linearization method of the present invention fits digital sensed flow rate signal 100 and linearized digital sensed flow rate signal 106 into a portion of the number range of DSP 102. In order to prevent number overflow within the arithmetic unit of DSP 102, a portion of the full range (−32768 to 32767) of the number field can be used for linearized digital sensed flow signal 106. Thus, a number can be assigned as a maximum linearized digital sensed flow rate signal 106 which will correspond to the sensed flow rate signal 96 output from flow sensor 92.

Flow sensor 92 may consist of two resistive temperature sensors wound around a capillary tube. The two resistive temperature sensors can couple to interface circuitry for conditioning the signal produced by the two resistive temperature sensors Particular reference is made to the interface circuit disclosed in U.S. patent application Ser. No. 09/350, 746 filed Jul. 9, 1999 by T. I. Pattantyus et. al. entitled "Improved Mass Flow Sensor Interface Circuit".

Controller 108 can be implemented using digital control methods known to those skilled in the art. These methods may include proportional-integral (PI) control and derivative control. Particular reference is made to the methods disclosed in U.S. patent application Ser. No. 09/351,120 filed on Jul. 10, 1999, by E. Vyers, entitled "A System and Method for Digital Mass Flow Controller," and U.S. patent application Ser. No. 09/351,098 filed on Jul. 10, 1999. by E. Vyers, entitled "System and Method For A Variable Gain Proportionial-Integral (PI) Controller."

Valve 114 may be a solenoid-activated valve. There are many circuit configurations that can be implemented for valve drive circuitry 112. These configurations may convert valve drive signal 112 into a drive current for a solenoid that drives valve 114. Many of these circuits include a control element, such as a transistor, providing either continuous voltage or switched pulse width modulated voltage across the solenoid. The switching pulse width is a function of valve drive signal 110. An average solenoid current, which is a function of the switching pulse width of the voltage across the solenoid, can be generated in the solenoid. The solenoid current can activate valve 114. Particular reference is made to the valve drive circuitry disclosed in U.S. patent application Ser. No 09/351,111 filed on Jul. 10, 1999, by T. I. Pattantyus, entitled "Method and System For Driving A Solenoid."

Mass flow controllers can implement a closed loop control algorithm. Reference is made to the advanced digital control algorithm disclosed in U.S. patent application Ser. No. 09/350,744 filed on Jul. 9, 1999 by K. Tinsley entitled "System and Method of Operation of a Digital Mass Flow Controller".

It is important to note that the present invention is not limited to used in a mass flow controller including the components and methods referenced above.

One technical advantage of the present invention is that the calibration procedure used to calculate the coefficients of the polynomial fit does not require manual tuning to linearize the sensor signal. Unlike prior art methods that use analog compensating circuits, the digital method of linearization uses computer 26 or 116 to calculate the coefficients. The calibration process with mass flow controller 90 can measure the sensed flow rate signal 96 for known flow rates. This data is used by computer 116 to calculate the coefficients. The calibration process does not require a technician or engineer to manually linearize the data by "tweaking" a circuit component in any compensating network such as those used in prior art methods.

Another technical advantage of the present invention is that it enables a digital method for linearization that includes the processing of very small numbers. For instance, when the size of the $\{m_1, m_n\}$ interval is the same order of magnitude as the $\{p_1, p_n\}$ range, ai is close to unity, and the products of $a_1 m_i, a_2 m_i^2, \ldots a_k m_i^k$ are also close to unity. However, when the value of m is anywhere from 0 to 25000 it is easy to see that the values of the $a_i$ coefficients (i>1) will be much less than unity. For DSP 102, it is difficult to work such small coefficients and perform the rigorous calculations needed to determine the coefficients. In the case of mass flow controller 90, these coefficients are typically much less than 1. Consequently, increased powers of these coefficients approach zero. A limited number fields in DSP 102 can prevent accurate calculation of the coefficients. The use of computer 116 allows the coefficients to be calculated in a more powerful computing environment than that of DSP 102. It is noted here that DSPs are not typically as powerful as a PC. The capacities of the program, ROM and RAM memories are much more limited in a DSP than a PC.

In summary, the method described enables the processing of large numbers multiplied by small numbers when the number fields for both large and small numbers are limited. Furthermore, the algorithm makes higher degree polynomial approximation feasible using a DSP type microprocessors with integer arithmetic.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A system for generating a linearized sensor signal from a sensed flow rate signal in a mass flow controller using a $k^{th}$-degree polynomial $p(m)=a_1 m+a_2 m^2+\ldots+a_k m^k$, where $p(m)$ is said linearized sensor signal, m is said sensed flow rate signal, and $a_j$, where j=1 through k, are a set of calculated coefficients, said system comprising:

a flow sensor that measures an actual flow rate and outputs the sensed flow rate signal; and a digital signal processor which in conjunction with a computer comprises instructions for converting the sensed flow signal to the linearized sensor signal.

2. The system of claim 1, wherein said computer comprises instructions for:

(a) calculating said calculated coefficients $a_j$ of said $k^{th}$-degree polynomial $p(m)=a_1 m+a_2 m^2+\ldots+a_k m^k$;

(b) for $2<j\leq k$, calculating $$a_j^{\frac{1}{2j-1}};$$

and (c) downloading results from steps (a)–(b) to a memory device in said digital signal processor.

3. The system of claim 2, wherein said digital signal processor comprises instructions for:

(a) for $2<j\leq k$, calculating $$\left(a_j^{\frac{1}{2j-1}} m\right)^j;$$

(b) for $2<j\leq k$, calculating $$\left(a_j^{\frac{1}{2j-1}}\right)^{j-1};$$

(c) for $2<j\leq k$, calculating $$\left(a_j^{\frac{1}{2j-1}} m\right)^j \left(a_j^{\frac{1}{2j-1}}\right)^{j-1};$$

(d) calculating $(a_1 m)$; and (e) calculating said linearized sensor signal according to the formula $$p(m) = (a_1 m) + \sum_{j=2}^{k} \left(\left(a_j^{\frac{1}{2j-1}} m\right)^j \left(a_j^{\frac{1}{2j-1}}\right)^{j-1}\right).$$

4. The system of claim 2, wherein said set of calculated coefficients $a_j$ of said $k^{th}$-degree polynomial $p(m)=a_1 m+a_2 m^2+\ldots+a_k m^k$ are calculated using a least-square error method.

5. The system of claim 1, wherein said sensed flow rate signal is digitized using an A-to-D converter prior to converting said sensed flow rate signal to said linearized sensor signal.

6. The system of claim 1, wherein said digital signal processor further comprises instructions for generating a valve control signal for controlling a valve in said mass flow controller.

7. A method for generating a linearized sensor signal from a sensed flow rate signal in a mass flow controller using a $k^{th}$-degree polynomial $p(m)=a_1m+a_2m^2+\ldots+a_km^k$, where $p(m)$ is said linearized sensor signal, m is said sensed flow rate signal, and $a_j$, where j=1 through k, are a set of calculated coefficients, said method comprising:
- measuring an actual flow rate with a flow sensor and outputting said sensed flow rate signal;
- generating said linearized sensor signal from said sensed flow rate signal using a digital signal processor in conjunction with a computer.

8. The method of claim 7, wherein said computer comprises instructions for:
- (a) calculating said set of calculated coefficients $a_j$ of said $k^{th}$-degree polynomial $p(m)=a_1m+a_2m^2+\ldots+a_km^k$;
- (b) for $2<j\leq k$, calculating $$a_j^{\frac{1}{2j-1}};$$

and
- (c) downloading results from steps (a)–(b) to a memory device in said digital signal processor;

9. The method of claim 8, wherein said digital signal processor comprises instructions for:
- (a) for $1<j\leq k$, calculating $$\left(a_j^{\frac{1}{2j-1}}m\right)^j;$$

- (b) for $2<j\leq k$, calculating $$\left(a_j^{\frac{1}{2j-1}}\right)^{j-1};$$

- (c) for $2<j\leq k$, calculating $$\left(a_j^{\frac{1}{2j-1}}m\right)^j\left(a_j^{\frac{1}{2j-1}}\right)^{j-1};$$

- (d) calculating $(a_1m)$; and
- (e) calculating said linearized sensor signal according to the formula $$p(m) = (a_1m) + \sum_{j=2}^{k}\left(\left(a_j^{\frac{1}{2j-1}}m\right)^j\left(a_j^{\frac{1}{2j-1}}\right)^{j-1}\right).$$

10. The method of claim 8, wherein said set of calculated coefficients $a_j$ of said $k^{th}$-degree polynomial $p(m)=a_1m+a_2m^2+\ldots+a_km^k$ are calculated using a least-square error method.

11. The method of claim 7, wherein said sensed flow rate signal is digitized using an A-to-D converter prior to converting said sensed flow rate signal to said linearized sensor signal.

12. The system of claim 7, wherein said digital signal processor further comprises instructions for generating a valve control signal for controlling a valve in said mass flow controller.

13. A system for generating a linearized sensor signal from a sensed flow rate signal in a mass flow controller using a $k^{th}$-degree polynomial $p(m)=a_1m+a_2m^2+\ldots+a_km^k$ where $p(m)$ is said linearized sensor signal, m is said sensed flow rate signal and $a_j$, where j=1 through k, are a set of calculated coefficients, said system comprising:
- a flow sensor that measures an actual flow rate and outputs said sensed flow rate signal;
- a computer comprising instructions for:
  - (a) calculating said set of calculated coefficients $a_j$ of said $k^{th}$-degree polynomial $p(m)=a_1m+a_2m^2+\ldots+a_km^k$ using a least-squares error method;
  - (b) for $2<j\leq k$, calculating $$a_j^{\frac{1}{2j-1}};$$

and
  - (c) downloading the results from steps (a)–(b) to a memory device in storage medium; and
- a digital signal processor including said storage medium and comprising instructions for:
  - (a) for $2<j\leq k$, calculating $$\left(a_j^{\frac{1}{2j-1}}m\right)^j;$$

- (b) for $2<j\leq k$, calculating $$\left(a_j^{\frac{1}{2j-1}}\right)^{j-1};$$

- (c) for $2<j\leq k$, calculating $$\left(a_j^{\frac{1}{2j-1}}m\right)^j\left(a_j^{\frac{1}{2j-1}}\right)^{j-1};$$

- (d) calculating $(a_1m)$; and
  - (e) calculating said linearized sensor signal according to a formula $$p(m) = (a_1m) + \sum_{j=2}^{k}\left(\left(a_j^{\frac{1}{2j-1}}m\right)^j\left(a_j^{\frac{1}{2j-1}}\right)^{j-1}\right).$$

14. A method for generating a linearized sensor signal from a sensor signal using a $k^{th}$-degree polynomial $p(m)=a_1m+a_2m^2+\ldots+a_km^k$, where $p(m)$ is said linearized sensor signal, m is said sensor signal, and $a_j$, where j=1 through k, are a set of calculated coefficients, said method comprising:
- generating said sensor signal from a sensor that measures a process parameter;
- generating said linearized sensor signal from said sensor signal using a digital signal processor in conjunction with a computer.

15. The method of claim 14, wherein said computer comprises instructions for:

(a) calculating said set of calculated coefficients $a_j$ of said $k^{th}$-degree polynomial $p(m)+a_1m+a_2m^2+\ldots a_km^k$;

(b) for $2<j\leqq k$, calculating $$a_j^{\frac{1}{2j-1}};$$

and (c) downloading results from steps (a)–(b) to a memory device in said digital signal processor.

16. The method of claim 15, wherein said digital signal processor comprises instructions for:

(a) for $2<j\leqq k$, calculating $$\left(a_j^{\frac{1}{2j-1}}m\right)^j;$$

(b) for $2<j\leqq k$, calculating $$\left(a_j^{\frac{1}{2j-1}}\right)^{j-1};$$

(c) for $2<j\leqq k$, calculating $$\left(a_j^{\frac{1}{2j-1}}m\right)^j\left(a_j^{\frac{1}{2j-1}}\right)^{j-1};$$

(d) calculating $(a_1m)$; and (e) calculating said linearized sensor signal according to the formula $$p(m) = (a_1m) + \sum_{j=2}^{k}\left(\left(a_j^{\frac{1}{2j-1}}m\right)^j\left(a_j^{\frac{1}{2j-1}}\right)^{j-1}\right).$$

17. The method of claim 15, wherein said calculated coefficients $a_j$ of said $k^{th}$-degree polynomial $p(m)=a_1m+a_2m^2+\ldots+a_km^k$ are calculated using a least-squares error method.

* * * * *

UNITED STATES PATENT AND TRADEMARK OFFICE
CERTIFICATE OF CORRECTION

PATENT NO.    : 6,449,571 B1
DATED         : September 10, 2002
INVENTOR(S)   : Faisal Tariq and Tamas I. Pattanyus It is certified that error appears in the above-identified patent and that said Letters Patent is hereby corrected as shown below:

<u>Title page,</u>
Item [75], Inventors, change "Tarig" to -- Tariq --;
Item [74], *Attorney, Agent or Firm*, change "Weaver" to -- Ware --;

<u>Column 4,</u>
Line 54, change "FIG 48" to -- FIG 4B --;
Line 64, change "$r_j=a_j^{1/2j-1}$" to -- $r_j=a_j^{1/(2j-1)}$ --;

<u>Column 5,</u>
Lines 16 and 17, change "$m_l$" to -- $m_i$ --

Signed and Sealed this

Second Day of December, 2003

JAMES E. ROGAN
*Director of the United States Patent and Trademark Office*